Jan. 21, 1941.   E. H. KOCHER   2,229,095
MACHINE TOOL LUBRICATION
Original Filed Sept. 24, 1934    4 Sheets-Sheet 1

INVENTOR
Edward H. Kocher
BY
ATTORNEYS

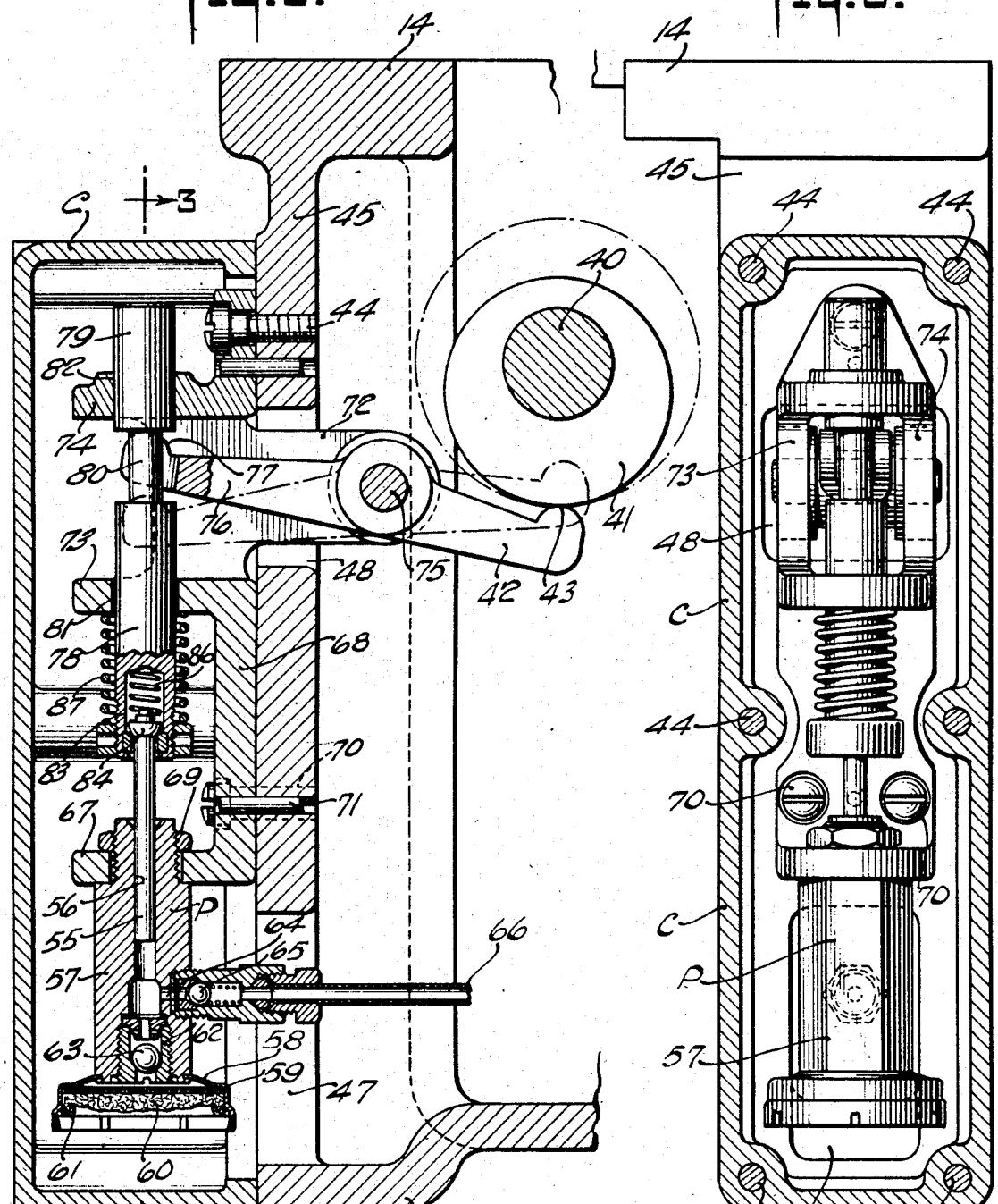
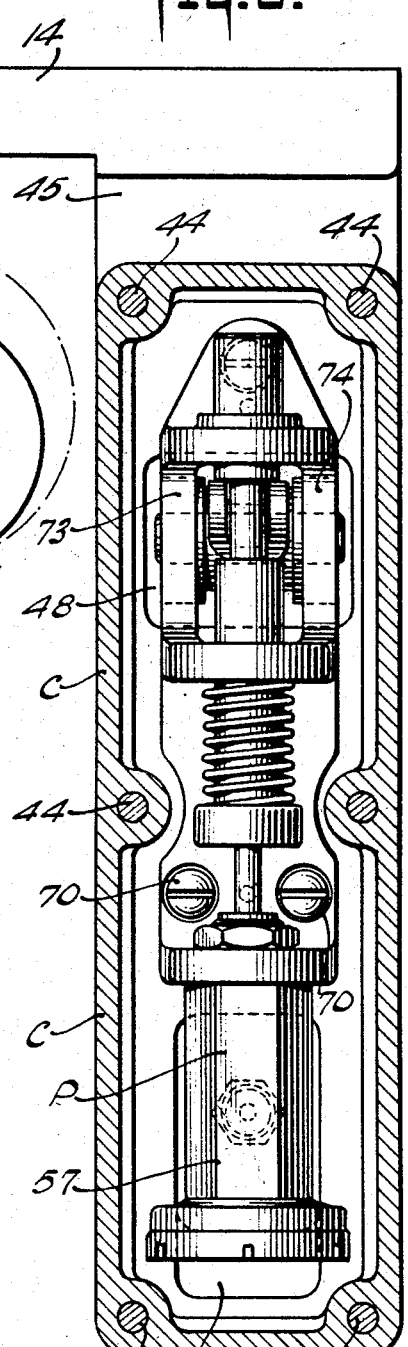
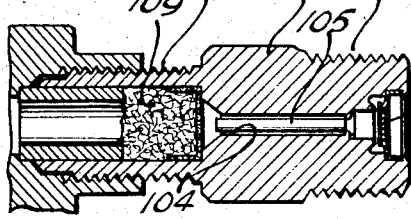

Jan. 21, 1941. E. H. KOCHER 2,229,095
MACHINE TOOL LUBRICATION
Original Filed Sept. 24, 1934 4 Sheets-Sheet 3

INVENTOR
Edward H. Kocher
BY
ATTORNEYS

Jan. 21, 1941.  E. H. KOCHER  2,229,095
MACHINE TOOL LUBRICATION
Original Filed Sept. 24, 1934    4 Sheets-Sheet 4
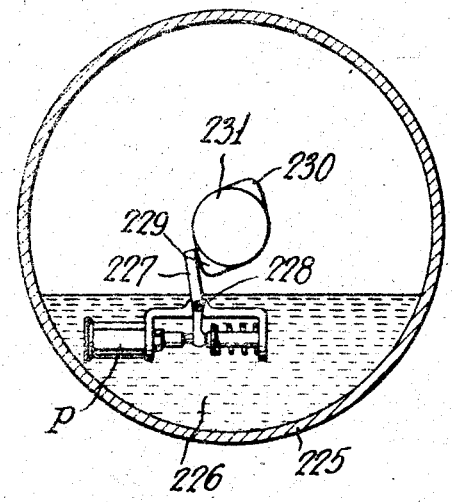
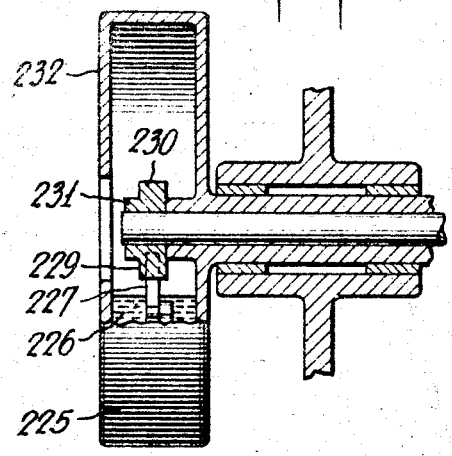
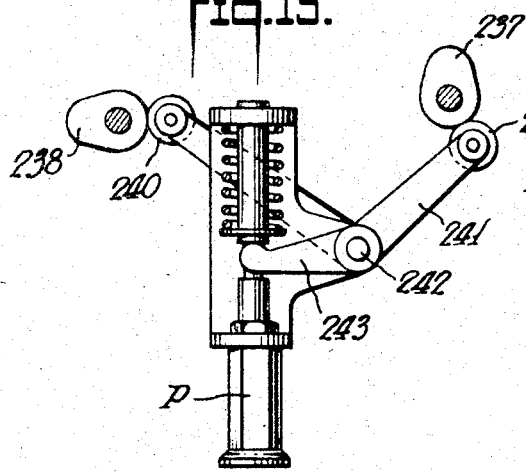
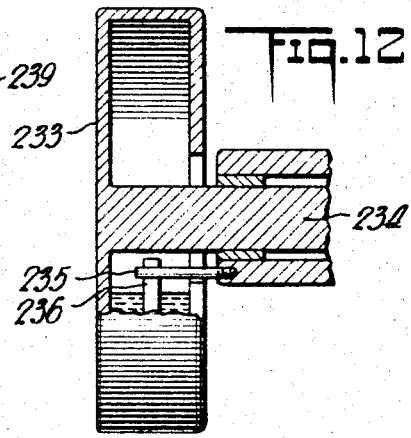
INVENTOR
*Edward H. Kocher*
BY
*Dean Fairbank Hirsch & Foster*
ATTORNEYS Patented Jan. 21, 1941

2,229,095

UNITED STATES PATENT OFFICE 2,229,095

MACHINE TOOL LUBRICATION

Edward H. Kocher, Boonton, N. J., assignor to Auto Research Corporation, a corporation of Delaware Application September 24, 1934, Serial No. 745,187
Renewed September 23, 1939

28 Claims. (Cl. 184—6)

The present invention relates to central lubricating systems which is generally adapted to machine tools and particularly adapted to the slide, compound rest, and apron bearings of lathes of various constructions.

In typical lathe constructions and other machine tools there are two parallel runways on either side of the machine, which guide and support the carriage. At the front of the lathe this carriage is provided with a depending apron structure which carries numerous control handles and associated mechanisms.

On the carriage itself is a subsidiary tool carrier, or a compound rest, which is provided with a pair of parallel transverse guides, the tool carrier being adapted to be shifted transversely of the carriage and of the runway of the carriage above referred to, for example, a transverse screw arrangement controlled from said apron structure.

The bearings of the carriage and apron structure are closely grouped together and the entire mechanism forms a compact structure which makes it unfeasible to utilize a series of separate pumps, one for each bearing, and/or to utilize an automatic system which may be operated from the mechanism operating the lathe, inasmuch as the carriage and apron should be assured relative freedom of movement backwardly and forwardly on their guideways without resorting to flexible conduits extending from other parts of the lathe structure.

An object of the invention is to provide a compact, convenient, and inexpensive central lubricating installation to be associated with the apron and carriage bearings of the lathe structure which will not materially increase the bulk or weight of said apron and carriage and which may be conveniently connected to supply the various bearings with the proper amounts of lubricant in accordance with their needs.

Other objects will appear during the course of the following specification.

In accomplishing these objects, it has been found most satisfactory to associate a compact small volume reciprocatory plunger pump structure with the apron of the lathe carriage in such a manner that the lower part of the apron affords a reservoir for the pump.

In the preferred embodiment, it has been found convenient to position the axis of the reciprocating pump horizontally and attach it and its reservoir to the lower part of the carriage. From this pump there may extend the principal feed line to a junction, which junction preferably has a plurality of restriction outlets connected by tail pipes, or drilled passages, to places of distribution.

To supply the certain bearings on the apron, it has been found satisfactory to utilize individual drip plugs for each bearing or to permit one of the drip plugs to feed a felt or wicking distribution pot from which a plurality of tail pipes lead to the various bearings. For the various bearings connected with the slides both transverse and longitudinal of the carriage and tool holder, it has been found most convenient to feed metered quantities of lubricant by tail pipes from a group of metering devices arranged at the upper part of the apron.

In the accompanying drawings in which are shown one or more of various possible embodiments of the several features of the invention, Fig. 1 is a perspective view illustrating the application of the lubricating installation of the present invention to a typical carriage and apron structure.

Fig. 2 is an upturned cross sectional view of the pump of Fig. 1.

Fig. 3 is a transverse sectional view upon the line 3—3 of Fig. 2, and

Fig. 4 is one form of a metering fitting which may be employed.

Figs. 5 to 13 illustrate alternative methods of actuating the central feed pump which may be immersed in the reservoir.

Figure 1:
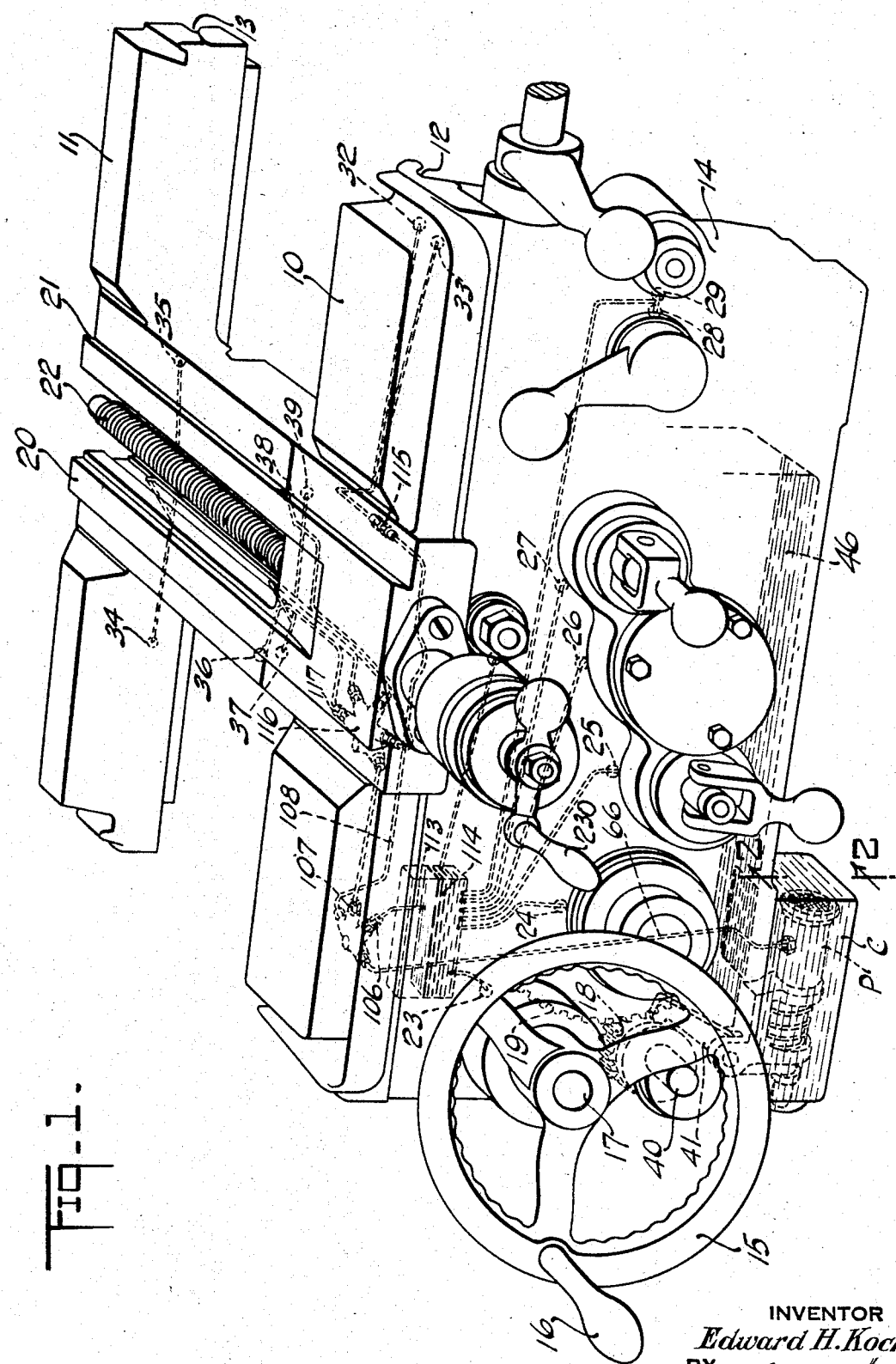

Referring to Fig. 1, the carriage structure is provided with two longitudinal members, a forward longitudinal member 10 and a rear longitudinal member 11, which at their bottom faces are respectively provided with the recesses 12 and 13, which are adapted to rest upon the main runways of the lathe structure (not shown). A forward part of the carriage is provided with the apron 14 having the hand wheel 15 and the handle 16 to enable manual adjustment of the lathe along said runways of the lathe bed.

The wheel 15 is pivotally mounted at 17 and upon rotation will turn the pinion 18 and the gear 19. The lathe is also provided with transverse runways 20, 21 having re-entrant shoulders, which support the transverse tool carrier (not shown). The transverse carriage 20, 21 is moved backwardly and forwardly by the screw 22 which is actuated by the handle 23 carried on the apron structure 14.

As indicated by the circles 23, 24, 25, 26, 27, 28 and 29, there are some seven bearings to be lubricated upon the apron structure. Upon the main slide structure there are six places 32, 33, 34 and 35 which are to be lubricated. On the subsidiary transverse slide structure there are four places to be lubricated indicated by the numerals 36, 37, 38 and 39.

The present invention is particularly concerned with the lubrication of the lathe structure, and upon the shaft 40 which is driven through the pinion 18 is located the cam structure 41, which drives the lever 42 of the pump operating mechanism by the follower projection 43.

The axis pump P, as shown in Fig. 1, is horizontally positioned and is held in a casing C which is suitably connected as by the screws 44 (see Figs 2 and 3) to the base 45 of the apron structure. The base 45 of the apron structure is adapted to receive a body of lubricant 46 (see Fig. 1), which finds ready access to the casing C through the openings 47 and 48.

The pump P is provided with a piston 55 received in a cylinder 56 in the hexagonal block 57. To the lower part of the cylinder block is connected the cup 58, in which is positioned the wire gauze 59 and the felt filter 60, both being held in position by the fastener ring 61.

In a pocket at the lower end of the block 57 (see Fig. 2) is formed a valve chamber 62 receiving the valve 63, which serves as an inlet valve to check return flow of lubricant past the filter 60. The side of the pump block 57 is provided with an outlet port 64 connecting with the spring seated outlet valve 65, which in turn is connected to the pipe 66 (see also Fig. 1).

The cylinder block 57 is held to the base 45 of the apron 14 by the flange 67 of the support or carrier member 68, the nut 69 holding said cylinder block 57 in position upon flange 67. The screws 70 connect the base 68 to the base member 45, the location pin 71 assuring proper alignment.

The upper part of the carrying structure 68 for the pump P (see Fig. 2) is provided with the rearwardly directed flange 72 and the downwardly directed pivot support members 73 and 74. These members 73—74 carry a pivot member 75 which in turn carries the oscillating actuating arm 42. The lower end 76 of the arm 42 is provided with a clevis member 77, fitting between the enlargements 78 and 79 on the connecting rod 80. The full and dot-dash lines indicate the extreme positions of the lever 76 in its oscillating movement.

The lower enlargement rides in the bore 81 in the flange 73, while the upper enlargement rides in the bore 82 in the flange 74. The lower portion of the enlargement 78 is provided with a recess 83, in which is received the enlargement 84 on the end of the piston 55, said enlargement 84 being pressed against one end of said recess by the spring 86. Spring 87 reacts against the flange 73 pressing the piston 55 to its extreme discharge position.

Referring to Fig. 1 the outlet line 66 leads to the junction drip plug, which is provided with the outlet metering fittings 106 and 107, and is connected to the line 108.

Although many types of metering fittings may be employed, one of the preferred forms is shown in Fig. 4. In Fig. 4 the drip plug or metering fitting body is threaded at each side, as indicated at 103, said drip plug being pyrovided with a central bore 104 substantially completely filled by the pin 105. The pin 105 leaves a crevice of one or more thousandths of an inch which determines the restriction effect and metering rating of the fitting.

The inlet end of the drip plug is provided with a socket receiving the filter 109 and the outlet end is provided with a socket receiving the check valve 110. The inlet end of the fitting may be connected to a junction (as shown) or to a pipe.

Other types of drip plugs than those shown may be employed or other metering fittings, such as measuring valves, and various types are more fully described in Patents Nos. 1,632,772, 1,734,026 and 1,734,027, as may also other metering fittings such as disclosed in copending application, Serial No. 580,668, filed August 9, 1922, Patent No. 1,975,920 and Serial No. 596,856, filed October 25, 1922, Patent No. 2,017,848.

Referring to Fig. 1, the drip plug 106 feeds the line 113 which leads to the pot or distributing receiver 114 filled with felt or some other absorptive material. From this felt are fed the lines or conduits which lead respectively to the bearings 23, 24, 25, 26, 27, 28 and 29. One of the lines from the junction leads to the drip plug 115 and from this drip plug 115 the bearings 32 and 33 are fed by suitable connections. The junction 116 feeds a plurality of drip plugs 117 which respectively lead to the bearings 34, 35, 36, 37, 38 and 39.

In operation most of the bearings in connection with the lathe and apron structure shown in Fig. 1 requires lubricant only in proportion to the movement and operation of the apron or carriage. It has been found that the hand wheel 15 will turn substantially proportionately to the requirements of these various bearings, and upon such complete turn of this wheel the cam 41 will be rotated, oscillating the piston 55 of Fig. 2. Every movement of the piston 55 will draw in a small charge of oil past the inlet valve 63 and eject it past the outlet valve 65 into the outlet conduit 66. This quantity of lubricant which is metered by the pump 55 will then be proportioned among the ..earings by the drip plug or other metering fittings 106, 107, 115, 117, and so forth, to the various bearings 23 to 39 about the lathe structure to be lubricated.

By this arrangement oil or lubricant is delivered in metered quantities to every moving part on the lathe structure without unduly increasing the bulk of the structure and without requiring attention by the lathe operator, except for filling the main reservoir at widely spaced intervals, for example, at intervals of once a month.

All the bearings to be lubricated on the apron, carriage bed and compound rest, will be automatically supplied with lubricant, and in addition the large diameter apron gears will dip in the oil of the main reservoir, as indicated in Fig. 1, with the result that the gears will carry oil to the entire gear train. As a result, undue wear and friction on bed, carriage, and apron bearings will be largely eliminated, with resultant increased life of the parts to at least two or three times their normal period.

Moreover, accuracy of the ways and apron bearings will be maintained for long periods of time.

The system will operate continuously upon revolution of the carriage feed shaft, and the positioning of the strainers at the inlet to the pump and at the inlet to the metering fittings or drip plugs will assure that metal particles will not enter the bearings with subsequent scoring. Moreover, the feed of lubricant will tend to wash dirt and chips out of the bearing structures.

In the operation of the pump when the piston 55 is withdrawn from the cylinder by the lever 42 pivoted on the pump support casting 68 by the action of the eccentric 41, fastened to the carriage feed shaft 40, the spring 87 will force the piston back into the cylinder 56 producing a pressure in the supply line depending on the rate of oscillation, resistance of outlets and the viscosity of the oil. The spring begins to act when the lever passes the crest of the eccentric, as shown in Fig. 2, and the pump continues to deliver oil until the lever is again picked up by the eccentric.

If desired, the spring pressure may be limited so that in quick traverse, when less oil is needed under light load, the number of full pump strokes is automatically reduced, whereas with a slow feed with the bearings working under heavy load, full delivery of pump is obtained at each stroke. As a general rule the principal bearings to be fed are the tool cross feed way (four surfaces, saddle rear flat way (one surface), saddle front flat way (one surface), saddle front V-way (one surface), and power feed shaft.

In operating the system of the present invention it has been found most satisfactory to use a good grade of machine oil, that is, clear mineral oil of 300 to 800 Saybolt seconds viscosity at 100 degrees F. Although many different sizes of pumps and types of pumps may be utilized, one preferred form of pump is one with a piston diameter of $\frac{3}{8}$ inch, a stroke of ½ inch, and arranged to have one stroke for every 1 to 3 inches of carriage travel.

Instead of utilizing the drip plug 106, the pipe 113 may lead to a junction, as indicated at 116, and this junction may be caused to feed the conduits leading to the bearings 23, 24, 25, 26, 27, 28 and 29 through drip plugs mounted in said junction.

Figure 5:
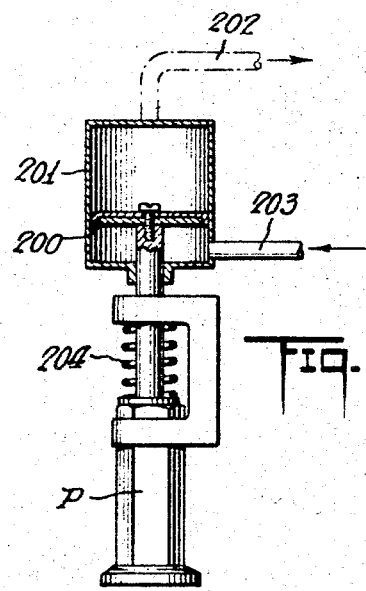

In Fig. 5 the pump P, which may be of the same construction as already described in connection with Figs. 1 to 4, is actuated by means of the piston 200 received in the cylinder 201, the upper side of said piston being connected at 202 to a source of vacuum and the lower side of said piston is connected to the atmosphere or to a source of fluid of oil pressure, as indicated at 203. In this embodiment the spring 204 is stressed upon upward strokes of the plunger and is released upon downward strokes of the plunger.

Figure 6:
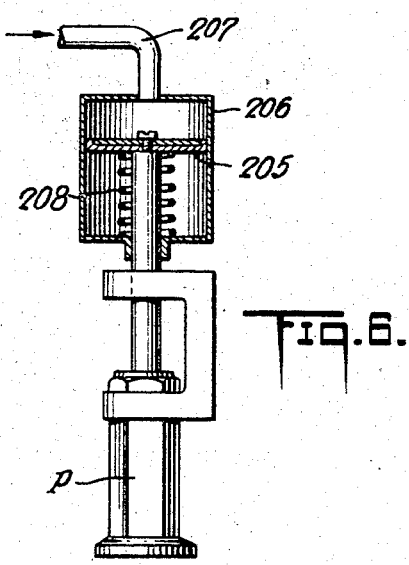

In Fig. 6 the pump P is actuated through the piston 205 received in the cylinder 206 which is connected to a source of oil or air pressure, as indicated at 207. It will be noted in this instance the spring 208 is received in the cylinder 206 and serves to press the piston toward the upper end of its stroke, as contrasted to the embodiment of Fig. 5 where the piston is pressed toward the lower end of its stroke.

Figure 7:
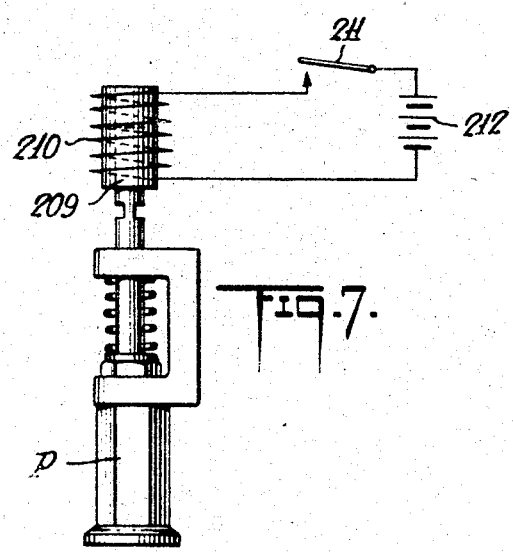

In Fig. 7 the piston of the pump P is actuated through the solenoid including the armature 209 and the helical coil 210. The switch 211 controls the passage of current through the coil 210 from the batteries 212 and it may be automatically actuated by operation of the mechanism to be lubricated, as may also the piston motors 200 of Fig. 5 and 205 of Fig. 6.

Figure 8:
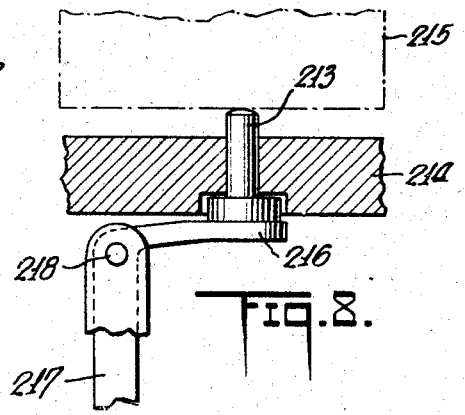

In Fig. 8 the pin 213 projects upwardly through the table 214 and when the table is being loaded, as by an element 215, the pin 213 will be pressed downwardly, depressing the arm 216 of the lever 217, the movement of the lever 217 about its pivot 218 actuating a pump. This pump may be of the same construction as described in connection with Figs. 1 to 4.

Figure 9:
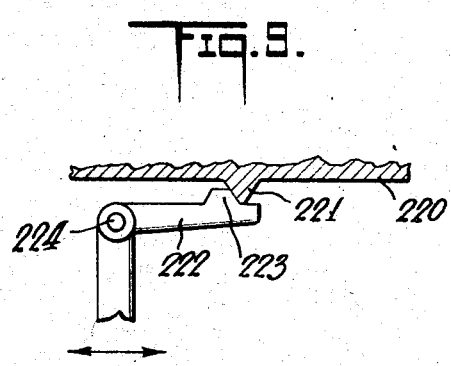

In Fig. 9 the moving table or device 220 is provided with an embossment or projection 221 which actuates the lever 222 on the carriage through contact by the operating projection 223. The lever in its movement about the pivot 224 will operate a piston, as already described in Figs. 1 to 4.

In Figs. 10 and 11, the pump structure P may be enclosed in the casing 225 which contains a body of oil 226. The lever 227 pivoted at 228 will then be actuated by the lobes 229 and 230 on the cam 231. If desired, both the shaft of the cam 231 and the drum may rotate at different speeds in respect to each other, or the drum may rotate and the cam stands still, or the drum may stand still and the cam rotate. As is apparent from the side view shown in Fig. 11 the front of the drum is annularly closed, as indicated at 232, so as to always retain the body of oil 226 in the lower part thereof so that the pump will be immersed when the lever 227 is being actuated by either one or both of the lobes 229 and 230.

In Fig. 12 is shown an arrangement in which the drum 233 is rotated by the shaft 234 while the pump structure is actuated by cooperation of the elements 235 and 236.

In Fig. 13 two cams 237 and 238 may be utilized to actuate the follower members 239 and 240 with the bell crank lever 241, which is pivoted at 242, said bell crank lever being provided with an extension 243.

The invention, however, is not intended to be restricted to any particular construction or arrangement of parts, or to any particular application of any such construction, or to any specific method of operation, or manner of use, or to any of various details thereof, herein shown and described, as the same may be modified in various particulars or be applied in many varied relations without departing from the spirit and scope of the claimed invention, the practical embodiments herein illustrated and described merely showing some of the various features entering into the application of the invention.

What is claimed is:

1. In an oiling device for the ways of a lathe, the combination with a slide and slide apron, of a spring discharged oil pump mounted on said apron, an oil container communicating with the intake side of said pump, an oil delivery conduit leading from the discharge side of said pump to points above the ways and movable bodily with said slide and apron, a shaft controlling the traverse mechanism of said slide, and an operating connection from said shaft to said pump to cause charging of the pump and to stress the discharging spring, which spring will be actuated subsequently to cause discharge of the pump.

2. In an oiling device for the ways of a lathe, the combination with a slide and slide apron, of an oil pump mounted on said apron, an oil container mounted on said apron and communicating with the intake side of said pump, an oil delivery conduit leading from the discharge side of said pump to points above the ways and movable bodily with said slide and apron, a hand wheel controlling the traverse mechanism of said slide, provided with a shaft and a cam and a connection from said cam to the plunger of said pump operative to effect a suction stroke of said plunger and a spring charged by said charge stroke subsequently effecting a discharge stroke of said plunger.

3. In an oiling device for the ways of a lathe, the combination with a slide and slide apron, of an oil container mounted below said apron, a horizontally mounted plunger pump mounted in said container and communicating on its intake side with the interior of the latter, an oil delivery conduit leading from the discharge side of said pump to points above the ways and movable bodily with said slide and apron, a hand wheel controlling the traverse mechanism of said slide and an operating connection from said wheel to said pump.

4. In an oiling device for the ways of a lathe, the combination with a slide having ducts opening through the portions thereof which ride on the ways, and a slide apron, of an oil pump mounted on said apron, an oil container communicating with the intake side of said pump, a tube extending from the discharge side of said pump to said duct, a device controlling the traverse mechanism of said slide, and an operating connection from said device to said pump to actuate said pump throughout traversing movement of the slide apron.

5. In an oiling device for the ways of a lathe, the combination with a slide and slide apron, of an oil pump mounted on said apron, an oil container communicating with the intake side of said pump, an oil delivery conduit leading from the discharge side of said pump to points above the ways and movable bodily with said slide and apron, a device mounted on said apron and controlling the traverse mechanism of said slide, and a link and lever operating connection from said device to the plunger of said pump said pump being actuated automatically throughout traversing movement of the slide apron.

6. An oil device for the bearings associated with the slide and slide apron of a lathe, comprising an oil reservoir formed in the lower part of said apron, a reciprocating spring-return piston pump to continuously feed lubricant during operation, means actuated upon reciprocation of said slide to cause at least one reciprocation of said pump for each reciprocation of said slide, said pump being positioned below and communicating with said oil reservoir, a junction positioned in the upper part of said apron substantially at the top of the slide and receiving lubricant under pressure from said pump and distributing it without substantial loss in pressure, a conduit extending from the outlet of the pump to said junction, a drip plug distributing system extending from said junction to the bearings associated with the slide and a gravity distributing system fed from said junction extending to the bearings associated with said apron, said drip plug system being provided with drip plugs removed from said junction and said gravity system being provided with drip plugs adjacent said junction.

7. In combination with a lathe of the type having a slide, a slide apron, said slide having a plurality of ways to be lubricated and said apron having a gear train also to be lubricated; a lubricating installation comprising a reservoir formed in the lower part of said apron, a reciprocating spring-return piston pump to continuously feed lubricant during operation, means actuated upon reciprocation of said slide to cause at least one reciprocation of said pump for each reciprocation of said slide, said pump being positioned at the lower part of said reservoir receiving lubricant from said apron, a distributing receiver positioned at the upper part of said apron receiving lubricant from said pump and receiving lubricant under pressure from said pump and distributing it without substantial loss in pressure, drip plug controlled distributing conduits from said distributing receiver to the ways to be lubricated, said gear train being located so that a portion thereof will be immersed in the lubricant in said reservoir, whereby said gear train will be lubricated, the drip plugs on said conduits being located substantially away from said receiver and at the level of the said receiver.

8. In a lathe lubricating installation, for the bearings associated with the slide and slide apron of a lathe, a reciprocating pump and a distributing system leading to said bearings fed from said reciprocating pump, said distributing system being provided with flow metering devices to proportion the lubricant among said bearings, said reciprocating pump being continuously actuated from the feed shaft of the lathe apron and slide.

9. In a lubricating installation for the bearings associated with the apron and slide of a lathe, a reciprocating spring discharged plunger pump and reservoir unit positioned in the lower part of said apron, a lever means to actuate said plunger, a cam actuating said lever and actuated in turn at the rate of traverse of said lathe, and a distributing system leading to said bearings fed from said pump, said distributing system being provided with flow metering devices to proportion the lubricant among said bearings.

10. In a lubricating installation for the bearings associated with the slide and apron of a lathe of the type having a carriage feed shaft, a reciprocating plunger pump provided with a return spring, a cam upon said feed shaft, said pump being charged by operation of said cam and being slowly discharged by operation of said spring, the period of discharge under the influence of said spring being so extended that a full discharge will not be obtained at rapid revolutions of said eccentric, so that less lubricant will be supplied in quick traverse under light load than in slow traverse under heavy load.

11. In an engine lathe in combination with the bed and carriage mounted for travel on the bed, and a cross feed tool-holder on the carriage, an apron structure depending from the carriage and provided with bearings, feed elements supported in the apron bearings and organized for moving the carriage on the bed and the slide on the carriage, said apron structure being also formed to constitute a base oil container below the bearings, a relatively elevated gravity feeding oil chamber above the bearings communicating with the oil container, and oil conduits leading downwardly from the chamber to the apron structure bearings, and thence draining into the base container, an oil pump controlling the passage from the container to the chamber, a pump operating mechanism operatively connected to the apron feed mechanism and a distributing system having an inlet from the pump and a plurality of outlets to the slide bearings to be lubricated.

12. An apron structure as a housing partly enclosing a feed mechanism, adapted for attachment to a lathe carriage having slide bearings, and comprising floor and wall members, the floor and wall members being provided respectively with an oil container and gravity feeding oil chamber, a pump controlling the oil circulation between said container and chamber, bearings for the feed mechanism positioned in the structure intermediate the container and chamber and draining into the container, and conduits leading to the chamber from the pump and from the chamber to said bearings, an automatic pump operating element actuated by the feed mechanism, and a distributing system having an inlet from the pump and a plurality of outlets to the slide bearings to be lubricated.

13. An oiling system for lathes having a reciprocating slide, comprising a pump for oil located in the apron, said pump having a spring-returned and discharged, small diameter elongated unpacked metal plunger, means to elevate said plunger and stress said spring at least once for each reciprocation of the slide, to cause a relatively continuous feed of lubricant during operation of the lathe, a reservoir in said apron, separate highly restricted distributing systems for delivering lubricant to the slideways and the apron bearings to be lubricated, the restrictions having a predominating restricting effect and being supplied with lubricant under full pump pressure to control its proportionment among the bearings to be lubricated and being located above the bearings and being connected thereto by gravity flow tail conduits.

14. An oiling system for lathes having a reciprocating slide comprising a pump for oil located in the apron, said pump having a spring-returned and discharged, small diameter elongated unpacked metal plunger, means to elevate said plunger and stress said spring at least once for each reciprocation of the slide, to cause a relatively continuous feed of lubricant during operation of the lathe, a junction at the top of the apron to which said oil is delivered by the pump, highly restricted passageways from said junction directed to the shaft apron bearings highly restricted, passageways from said junction directed to the top of the slide and a reservoir in the apron, the restrictions having a predominating restricting effect and being supplied with lubricant under full pump pressure to control its proportionment among the bearings to be lubricated and being located above the bearings and being connected thereto by gravity flow tail conduits.

15. An oiling system for lathes having a reciprocating slide comprising an oil pump in the apron, said pump having a spring-returned and discharged, small diameter elongated unpacked metal plunger, means to elevate said plunger and stress said spring at least once for each reciprocation of the slide, to cause a relatively continuous feed of lubricant during operation of the lathe, channels in the slide adjacent the cross slide ways to which oil is delivered by the pump, passages therefrom to the cross slideways, and highly restricted passages from the pump to the top of the apron for delivering oil by gravity to the interior of the apron, the restrictions having a predominating restricting effect and being supplied with lubricant under full pump pressure to control its proportionment among the bearings to be lubricated and being located above the bearings and being connected thereto by gravity flow tail conduits.

16. An oiling system for lathes having a reciprocating slide comprising an oil reservoir and a pump, said pump having a spring-return plunger, means to reciprocate said plunger at least once for each reciprocation of the slide, to cause a continuous feed of lubricant during operation of the lathe, highly restricted separate distributing systems for delivering lubricant to the slideways and the apron bearings to be lubricated, a distributing receiver fed by said pump and feeding said systems, the restrictions having a predominating restricting effect and being supplied with lubricant under full pump pressure to control its proportionment among the bearings to be lubricated and being located above the bearings and being connected thereto by gravity flow tail conduits.

17. In a lubricating installation for a mechanism having a plurality of spaced and distributed bearings requiring small, yet relatively accurately metered quantities of lubricant, the combination therewith of a lubricant reservoir formed by providing a lubricant pocket on the mechanism, a pump immersed in said pocket, an automatic actuating means operated by said mechanism and driving said pump to feed lubricant substantially continuously to the bearings during operation of said mechanism and a distributing system having an inlet from said pump and a plurality of outlets to said bearings, said system having proportioning restrictions to proportion the flow of lubricant among said bearings, said system including a distributing receiver at a relatively high elevation above the bearings to be lubricated and separate series of passageways including said restrictions fed from said receiver to feed the bearings at different levels, the restrictions having a predominating restricting effect and being supplied with lubricant under full pump pressure to control its proportionment among the bearings to be lubricated and being located above the bearings and being connected thereto by gravity flow tail conduits.

18. A lubricating installation for a machine tool mechanism of the type having a base, a carrier for the metal body to be worked and a carrier for the working tool, one of said carriers being reciprocable upon said base and said base being provided with slideways upon which said carrier reciprocates, which slideways constitute the bearings to be lubricated by said installation, said installation comprising a lubricant reservoir formed by providing a lubricant pocket on the mechanism, a reciprocating, small diameter elongated unpacked metal plunger pump immersed in said pocket, an automatic actuating means operated by said mechanism and driving said pump to feed lubricant substantially continuously to the bearings during operation of said mechanism, said pump being reciprocated at least once for each traverse of the carrier and a distributing system having an inlet from said pump and a plurality of outlets to said bearings, said system having proportioning restrictions to proportion the flow of lubricant among said bearings, said pump being provided with a horizontally disposed cylinder and receiving said plunger in said cylinder and said actuating means including a lever connected to said mechanism to cause rapid reciprocation of said pump, the restrictions having a predominating restricting effect and being supplied with lubricant under full pump pressure to control its proportionment among the bearings to be lubricated and being located above the bearings and being connected thereto by gravity flow tail conduits.

19. In a lathe apron and slide lubrication installation, a reservoir in the lower part of the apron, a reciprocating, spring-returned and discharged, small diameter elongated unpacked metal plunger pump immersed therein, separate highly restricted distributing systems feeding said apron and slide bearings, a common junction feeding both systems and a connection from said pump to said junction, the restrictions having a predominating restricting effect and being supplied with lubricant under full pump pressure to control its proportionment among the bearings to be lubricated and being located above the bearings and being connected thereto by gravity flow tail conduits and said pump being reciprocated at least once during each traverse of said apron to feed lubricant continuously to said bearings during operation of the lathe.

20. In a lathe apron and slide lubrication installation, a reservoir in the lower part of the apron, a reciprocating, spring-returned and discharged, small diameter elongated unpacked metal plunger pump immersed therein, separate highly restricted distributing systems feeding said apron and slide bearings, a common junction feeding both systems and a connection from said pump to said junction, said pump being automatically actuated to feed lubricant to said junction upon traversing movement of the apron, the restrictions having a predominating restricting effect and being supplied with lubricant under full pump pressure to control its proportionment among the bearings to be lubricated and being located above the bearings and being connected thereto by gravity flow tail conduits and said pump being reciprocated at least once during each traverse of said apron to feed lubricant continuously to said bearings during operation of the lathe.

21. In a lathe apron and slide lubrication installation, a reservoir in the lower part of the apron, a reciprocating, spring-returned and discharged, small diameter elongated unpacked metal plunger pump immersed therein, separate highly restricted distributing systems feeding said apron and slide bearings, a common junction feeding both systems and a connection from said pump to said junction, said junction being located at the top of said apron, the restrictions having a predominating restricting effect and being supplied with lubricant under full pump pressure to control its proportionment among the bearings to be lubricated and being located above the bearings and being connected thereto by gravity flow tail conduits and said pump being reciprocated at least once during each traverse of said apron to feed lubricant continuously to said bearings during operation of the lathe.

22. A lubricating installation for a machine tool mechanism of the type having a base, a carrier for the metal body to be worked and a carrier for the working tool, one of said carriers being reciprocable upon said base and said base being provided with slideways upon which said carrier reciprocates, which slideways constitute the bearings to be lubricated by said installation, said installation comprising a lubricant reservoir formed by providing a lubricant pocket on the mechanism, a reciprocating, small diameter elongated unpacked metal plunger pump immersed in said pocket, an automatic actuating means operated by said mechanism and driving said pump to feed lubricant substantially continuously to the bearings during operation of said mechanism, said pump being reciprocated at least once for each traverse of the carrier and a distributing system having an inlet from said pump and a plurality of outlets to said bearings, said system having proportioning restrictions to proportion the flow of lubricant among said bearings, said pump being provided with a cylinder block with an elongated small diameter bore therein and receiving said plunger therein in said bore and a bracket, carrying said block, guiding the movement of said plunger, providing a connection for the pump to said mechanism and providing a bearing for said actuating means, the restrictions having a predominating restricting effect and being supplied with lubricant under full pump pressure to control its proportionment among the bearings to be lubricated and being located above the bearings and being connected thereto by gravity flow tail conduits.

23. A lubricating installation for a machine tool mechanism of the type having a base, a carrier for the metal body to be worked and a carrier for the working tool, one of said carriers being reciprocable upon said base and said base being provided with slideways upon which said carrier reciprocates, which slideways constitute the bearings to be lubricated by said installation, said installation comprising a lubricant reservoir formed by providing a lubricant pocket on the mechanism, a reciprocating, spring-return plunger pump immersed in said pocket, an automatic actuating means operated by said mechanism and driving said pump to feed lubricant substantially continuously to the bearings during operation of said mechanism, said pump being reciprocated at least once for each traverse of this carrier and a distributing system having an inlet from said pump and a plurality of outlets to said bearings, said system having proportioning restrictions to proportion the flow of lubricant among said bearings, said pump being provided with a cylinder block with an elongated small diameter bore therein, an elongated unpacked small-diameter plunger therein in said bore and a U-shaped bracket, one leg of which is connected to one end of said block, the other leg of which forms a guiding bearing for said plunger and a reaction member the return spring of the plunger, the base of which forms a means of connection to the mechanism and an extension from the base of which forms a mount for said actuating means, the restrictions having a predominating restricting effect and being supplied with lubricant under full pump pressure to control its proportionment among the bearings to be lubricated and being located above the bearings and being connected thereto by gravity flow tail conduits.

24. A lubricating installation for a machine tool mechanism of the type having a base, a carrier for the metal body to be worked and a carrier for the working tool, one of said carriers being reciprocable upon said base and said base being provided with slideways upon which said carrier reciprocates, which slideways constitute the bearings to be lubricated by said installation, said installation comprising a reservoir in the lower portion of said reciprocating carrier, a reciprocating, spring-returned and discharged, small diameter elongated unpacked plunger pump immersed in lubricant in bottom of said reservoir and actuating means for said pump to cause said pump to reciprocate at least once for each traversing movement of said reciprocating carrier, whereby lubricant will be substantially continuously supplied to said bearings during operation of the mechanism, a branched conduit system with an inlet from said pump and a plurality of outlets to said bearings, said system being provided with means to control the distribution of the lubricant among said bearings and said automatic actuator being operated to cause said pump to charge with lubricant from the reservoir and discharge it into said system during operation of said machine, said controlling means including a plurality of restricted passages positioned above the bearings to be lubricated, said restricted passages being fed under full pump pressure and a plurality of tail passages beyond said restricted passages permitting gravity flow therethrough to the bearings.

25. A lubricating installation for a machine tool mechanism of the type having a base, a carrier for the metal body to be worked and a carrier for the working tool, one of said carriers being reciprocable upon said base and said base being provided with slideways upon which said carrier reciprocates, which slideways constitute the bearings to be lubricated by said installation, said installation comprising a reservoir in the lower portion of said reciprocating carrier, a reciprocating, spring-returned and discharged, small diameter elongated unpacked plunger pump immersed in lubricant in bottom of said reservoir and actuating means for said pump to cause said pump to reciprocate at least once for each traversing movement of said reciprocating carrier, whereby lubricant will be substantially continuously supplied to said bearings during operation of the mechanism, a branched conduit system with an inlet from said pump and a plurality of outlets to said bearings, said system being provided with means to control the distribution of the lubricant among said bearings and said automatic actuator being operated to cause said pump to charge with lubricant from the reservoir and discharge it into said system during operation of said machine, said controlling means including a plurality of restricted passages positioned above the bearings to be lubricated, said restricted passages being fed under full pump pressure and a plurality of tail passages beyond said restricted passages permitting gravity flow therethrough to the bearings, and during reciprocating movement of said reciprocating member, said pump being operated continuously during said reciprocating movement.

26. A lubricating installation for a machine tool mechanism of the type having a base, a carrier for the metal body to be worked and a carrier for the working tool, one of said carriers being reciprocable upon said base and said base being provided with slideways upon which said carrier reciprocates, which slideways constitute the bearings to be lubricated by said installation, said installation comprising a reservoir in the lower portion of said reciprocating carrier, a pump immersing in lubricant in the bottom of said reservoir and actuating means for said pump operated by movement of said carrier, to cause said pump to discharge at least for each transversing movement of said reciprocating carrier, whereby lubricant will be substantially continuously discharged to said bearings during operation of the mechanism, said pump including a pump cylinder, a pump plunger reciprocating therein, a return spring, an actuating rod, an actuating lever and a support frame having a support extension for said cylinder and additional support extensions affording bearings for said actuating rod and said actuating lever and a reaction member for said spring, said rod and said piston being operatively connected and said frame having a readily detachable connection for application to the interior of a lubricant reservoir.

27. In a centralized lubricating installation for a mechanism having a wall structure, a lubricant well associated with said wall structure, said structure having an opening into said well, a bracket having a base mounted on said wall and three outstanding arms, a pump having a cylinder, piston and connecting rod, one of said arms carrying said cylinder and two of said arms affording bearings for said connecting rod and a lever extending through said opening, actuating said connecting rod.

28. The installation of claim 27, said outstanding arms being on one side of said base, and two outstanding arms being provided on the other side of said base forming a pivot mount for said lever, said last-mentioned outstanding arms extending through said opening.

EDWARD H. KOCHER.